US010525421B1

(12) United States Patent
Kolel-Veetil et al.

(10) Patent No.: US 10,525,421 B1
(45) Date of Patent: *Jan. 7, 2020

(54) NANOPOROUS GRAPHENE MEMBRANES

(71) Applicants: Manoj K. Kolel-Veetil, Alexandria, VA (US); Paul E. Sheehan, Springfield, VA (US)

(72) Inventors: Manoj K. Kolel-Veetil, Alexandria, VA (US); Paul E. Sheehan, Springfield, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 661 days.

This patent is subject to a terminal disclaimer.

(21) Appl. No.: 14/207,912

(22) Filed: Mar. 13, 2014

Related U.S. Application Data

(60) Provisional application No. 61/789,981, filed on Mar. 15, 2013.

(51) Int. Cl.
| | |
|---|---|
| *B01D 71/44* | (2006.01) |
| *B01D 71/02* | (2006.01) |
| *C02F 1/44* | (2006.01) |
| *B01D 53/22* | (2006.01) |
| *B01D 69/14* | (2006.01) |

(52) U.S. Cl.
CPC .......... *B01D 71/44* (2013.01); *B01D 53/228* (2013.01); *B01D 69/148* (2013.01); *B01D 71/021* (2013.01); *C02F 1/442* (2013.01); *B01D 2053/221* (2013.01)

(58) Field of Classification Search
None
See application file for complete search history.

(56) References Cited

U.S. PATENT DOCUMENTS

| | | |
|---|---|---|
| 7,070,753 B2 | 7/2006 | Niu et al. |
| 2005/0229335 A1 | 10/2005 | Huang et al. |

(Continued)

OTHER PUBLICATIONS

B. M. Venkatesan, B. Dorvel, S. Yemenicioglu, N. Watkins, I. Petrov, R. Bashir, Adv. Mater. 2009, 21, 2771.*

(Continued)

*Primary Examiner* — Jason M Greene
*Assistant Examiner* — Eric J McCullough
(74) *Attorney, Agent, or Firm* — US Naval Research Laboratory; Joseph T. Grunkemeyer

(57) ABSTRACT

An article having a nanoporous membrane and a nanoporous graphene sheet layered on the nanoporous membrane. A method of: depositing a layer of a diblock copolymer onto a graphene sheet, and etching a minor phase of the diblock copolymer and a portion of the graphene in contact with the minor phase to form a nanoporous article having a nanoporous graphene sheet and a nanoporous layer of a polymer. A method of: depositing a hexaiodo-substituted macrocycle onto a substrate having a Ag(111) surface; coupling the macrocycle to form a nanoporous graphene sheet; layering the graphene sheet and substrate onto a nanoporous membrane with the graphene sheet in contact with the nanoporous membrane; and etching away the substrate.

11 Claims, 4 Drawing Sheets

(56) References Cited

U.S. PATENT DOCUMENTS

| | | | | |
|---|---|---|---|---|
| 2008/0149561 | A1* | 6/2008 | Chu | A61L 15/425 |
| | | | | 210/500.38 |
| 2009/0056802 | A1* | 3/2009 | Rabani | B82B 3/00 |
| | | | | 136/256 |
| 2011/0189452 | A1* | 8/2011 | Lettow | B05D 3/10 |
| | | | | 428/220 |
| 2011/0232061 | A1* | 9/2011 | Jons | B01D 63/10 |
| | | | | 29/426.2 |
| 2011/0309462 | A1 | 12/2011 | Sargent et al. | |
| 2012/0000853 | A1* | 1/2012 | Tuteja | B01D 69/02 |
| | | | | 210/650 |
| 2012/0048804 | A1* | 3/2012 | Stetson | B01D 61/02 |
| | | | | 210/653 |

OTHER PUBLICATIONS

High-Throughput Membrane Surface Modification to Control NOM Fouling. Mingyan Zhou, Hongwei Liu, James E. Kilduff, Robert Langer, Daniel G. Anderson, and Georges Belfort. Environmental Science & Technology 2009 43 (10), 3865-3871 DOI: (Year 2009).*
An Asymmetrically Surface-Modified Graphene Film Electrochemical Actuator. Xuejun Xie, Liangti Qu, Ce Zhou, Yan Li, Jia Zhu, Hua Bai, Gaoquan Shi, and Liming Dai, ACS Nano 2010 4 (10), 6050-6054, DOI: 10.1021/nn101563x (Year: 2010).*
Blankenburg et al., "Porous Graphene as an Atmospheric Nanofilter" small 2010, 6, No. 20, 2266-2271.
Bunch et al., "Impermeable Atomic Membranes from Graphene Sheets" Nano Letters, 8(8), 2458-2462 (2008).
Keeley et al., "DMF-exfoliated graphene for electrochemical NADH detection" Phys. Chem. Chem. Phys., 2011, 13, 7747-7750.
Koenig et al., "Selective molecular sieving through porous graphene" Nature Technol. 7, 728-732 (Nov. 2013).
Leenaerts et al.. "Graphene: A perfect nanoballoon" Appl. Phys. Lett. 93, 193107 (2008).
Nair et al., "Unimpeded Permeation of Water Through Helium-Leak-Tight Graphene-Based Membranes" Science 335, 442 (2012).
Park et al., "Block Copolymer Lithography: Periodic Arrays of ~1011 Holes in 1 Square Centimeter" Science 276, 1401-1405 (1997).
Pisula et al., "Columnar Mesophase Formation of Cyclohexa-m-phenylene-Based Macrocycles" Chem. Asian J. 2007, 2, 51-56.
"Thioester." _Wikipedia_. Mar. 9, 2011 [http://en.wikipedia.org/wiki/Thioester]. _Internet Archive_. [https://web.archive.org/web/20110309054510/http ://en.wikipedia.org/wiki/Thioester].
Office Action in U.S. Appl. No. 14/207,913 (dated Oct. 11, 2016).

* cited by examiner

NANOPOROUS GRAPHENE MEMBRANES

This application claims the benefit of U.S. Provisional Application No. 61/789,981, filed on Mar. 15, 2013. The provisional application is incorporated herein by reference.

TECHNICAL FIELD

The present disclosure is generally related to graphene membranes.

DESCRIPTION OF RELATED ART

Water scarcity is a serious challenge of our time. Over one-third of the world's population lives in water-stressed countries and by 2025, this figure is predicted to rise to nearly two-thirds. Seawater desalination offers the potential for an abundant and steady source of fresh water purified from the vast oceans especially for water scarce countries that already implement all other measures for freshwater generation.

Transformational development in desalination technology requires that the next generation membranes provide enhanced fluxes of water while both selectively rejecting salts and other biohazardous entities and simultaneously resisting chemical degradation. The current state-of-the art reverse osmosis (RO) membranes used in desalination have almost reached their maximum efficiency in terms of available flux and energy requirements (Lee et al., *J. Membr. Sci.* 2011, 370, 1-22; Zhao et al., *J. Membr. Sci.* 2012, 396, 1-21). The best thin film composite (TFC) membranes provide water permeabilities around $3.5 \times 10^{-12}$ $m^3 m^{-2} Pa^{-1} s^{-1}$ and reject 99.6 to 99.7% of the salts in seawater (Busch et al., W.E. *Desalination* 2004, 165, 299-307). For this technology, empirical evidence suggests that increasing the water permeability will require sacrificing selectivity (Geise et al., *J. Membr. Sci.* 2011, 369, 130-141). More importantly, TFC membranes are prone to degradation by chlorine that originates from the water pretreatment chemicals such as hypochlorite and to biofouling. In this regard, the predicted "ballistic-like" transport of water through carbon materials such carbon nanotubes, nanoporous graphene (nG), and between layers of graphene oxide (water migrates 10 billion times faster than helium through nanoporous graphene oxide (Nair et al., *Science* 2012, 335, 442-444)), positions nG as a potential transformational candidate for the development of the next generation desalination membranes. Its candidacy is further appealing as it is immune to degradation by chlorine attack and biofouling.

Even though the desalination ability of a graphene layer has been calculated (Cohen-Tanugi et al., *Nano Lett.* 2012, 12, 3602-360), the utilization of such a material in a filter has not been realized due to the difficulty in the scalable manufacturing of large graphene membranes with subnanometer pores with a narrow size distribution while maintaining the structural integrity of the graphene and keeping costs low (Wang, *Nature Nanotech.* 2012, 7, 552-554).

BRIEF SUMMARY

Disclosed herein is an article comprising: a nanoporous membrane; and a nanoporous graphene sheet layered on the nanoporous membrane.

Also disclosed herein is a method comprising: depositing a layer of a diblock copolymer onto a graphene sheet; and etching a minor phase of the diblock copolymer and a portion of the graphene in contact with the minor phase to form a nanoporous article comprising a nanoporous graphene sheet and a nanoporous layer of a polymer.

Also disclosed herein is a method comprising: depositing a hexaiodo-substituted macrocycle onto a substrate comprising a Ag(111) surface; coupling the macrocycle to form a nanoporous graphene sheet; layering the graphene sheet and substrate onto a nanoporous membrane with the graphene sheet in contact with the nanoporous membrane; and etching away the substrate.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

The interest in high performance, highly species-selective nanoporous membranes stems from their utility in applications such as the desalination of seawater (Elimelech et al., *Science* 2011, 333, 712-717; Shannon et al., *Nature* 2008, 452, 301-310), treatment of aqueous waste effluents and contaminated ground water containing toxic radionuclides (Romanchuck et al. *Phys. Chem. Chem. Phys.* 2013, 15, 2321-2327), highly selective gas separation in gas sensors and fuel cells (Blankenberg et al. *Small* 2010, 6(20), 2266-2271), isotope separation (Schrier et al., *Chem. Phys. Lett.* 2012, 521, 118-124), and in other diverse applications to mention just a few. Disclosed herein is the utilization of nanoporous graphene to build the membranes usable for desalination, chemical warfare agent (CWA) decontamination, radionuclide separation from ground water, gas separation, etc. Furthermore, low cost, high performance filtration based on a flexible material would greatly enhance the performance of both sensors and wearable protection.

Two methods of formation of new ultrathin nG filtration membranes with inherent chemical selectivity are proposed herein. Such membranes can especially find use in water purification owing to their expected increased flux and resistivity to biofouling characteristics. Furthermore, they can be used in CWA decontamination, radionuclide separation from ground water, gas separation, etc.

In a first method, nanopores on a graphene plane are formed by a diblock copolymer deposition and the selective removal of one of the blocks (Bai et al., *Nature Nanotech.* 2010, 5, 190-194; Kelley et al., *Phys. Chem. Chem. Phys.* 2011, 13, 7747-7750). This opens ~10 nm wide circular areas in the graphene that have a ~39 nm pitch. These open areas can be used for subsequent pore formation. In the simplest approach, a quick plasma etch opens nanopores commensurate with the dimensions of the sacrificed block. Typically, the lowest range of pore sizes possible by this method is 10-20 nm. However, recent advances indicate that sub 10 nm control should be possible (Bunch et al., *Nano Lett.* 2008, 8, 2458; Leenaerts et al., *Appl. Phys. Lett.* 2008, 93, 193107). Alternately, UV-ozone treatment of the open areas can produce sub-nm sized selective pores (Koenig et al., *Nature Nanotech.* 2012, 7, 728-732).

Figure 1:
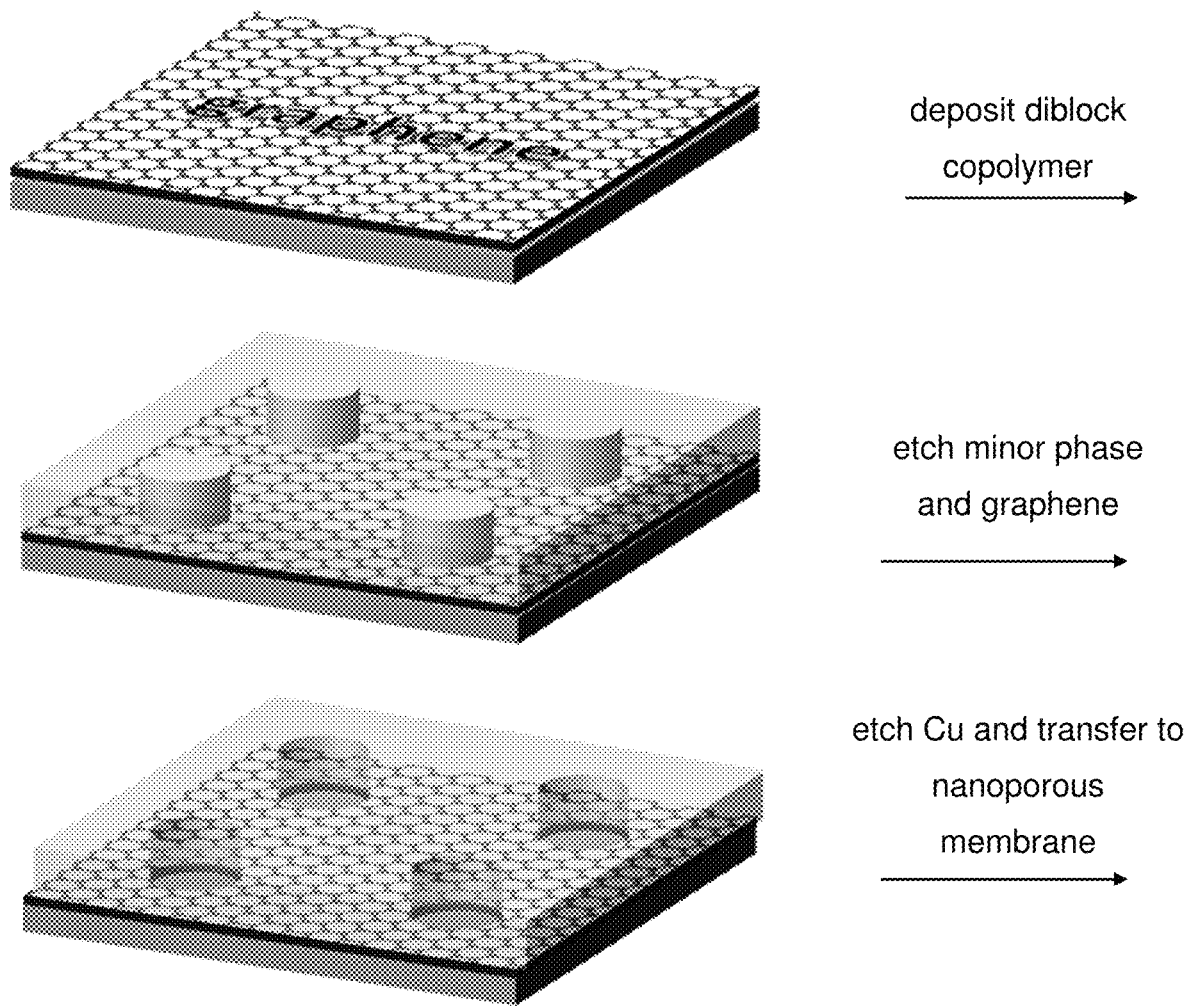
FIG. 1 shows a schematic representation of the production of a hybrid delta membrane produced by nanopore formation on graphene using diblock copolymers from the graphene sheet to the etched polymer.
Figure 2:
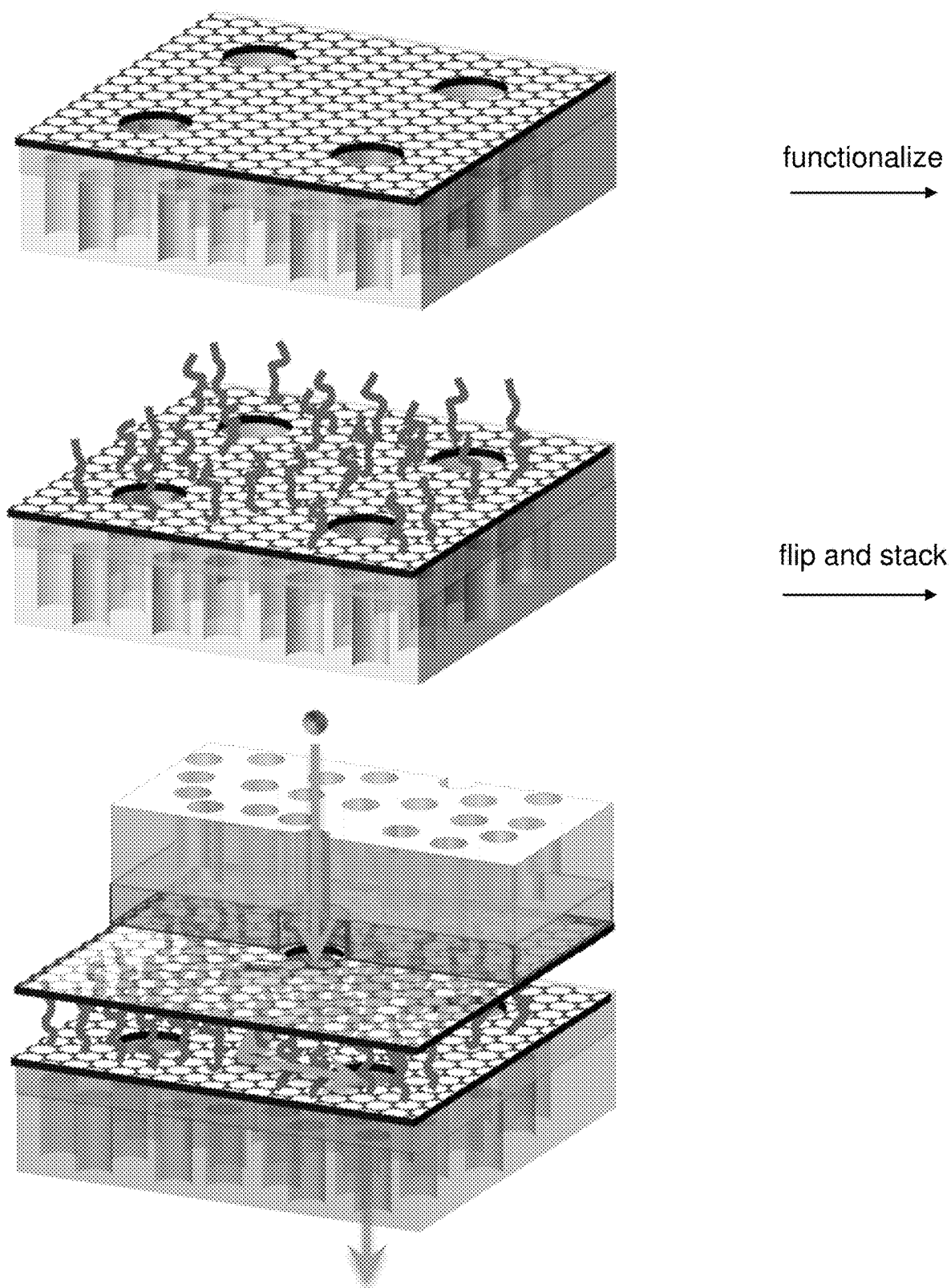
FIG. 2 shows a continuation of the method beginning in FIG. 1 up to the final membrane.

FIGS. 1 and 2 schematically illustrate the concept of a "hybrid delta membrane" which comprises two functionalized graphene membrane filters that are supported by nanoporous membranes and then pressed together. The supporting nanoporous membrane can be alumina, on which nanoporous graphene has been calculated to be adhered upon (Blankenberg et al., *Small* 2010, 6(20), 2266-2271) or a support structure as found in a conventional TFC membrane such as polysulfone or polythiosulfone segment used in desalination technology (Lee et al., *J. Membr. Sci.* 2011, 370, 1-22; Zhao et al., *J. Membr. Sci.* 2012, 396, 1-21). A critical capability of nG membrane filter is its three levels of filtration: rough filtration occurs in the supporting nanoporous membrane, size selection occurs via the width of the nanopore opened in the graphene, and chemical selection occurs at the edges of nanopore but more importantly in the nanoscopically thin gallery between the two graphene sheets. A molecule, the small ball in FIG. 2, will need to traverse the conventional membrane, enter through one of the etched holes in the upper graphene sheet, pass along the chemically functionalized gallery, out through the etched hole in the lower graphene, then exit through the lower filter support. The third level of filtration is especially useful if exclusion of a particular species cannot be realized by separation based merely on its size.

There are many potential benefits to this approach. First, despite being an atomic layer thick, graphene is impermeable to all gases and liquids (Bai et al., *Nature Nanotech.* 2010, 5, 190-194). This ensures that all molecules that pass through the system must pass through the nanopores and the galleries. Secondly, accepted molecules such as water move at ballistic speeds through the galleries much as they do through unfunctionalized carbon nanotubes (Majumder et al., *Nature* 2005, 438, 44-51) and graphene (Suk et al., *Phys. Chem. Lett.* 2010, 1, 1590-1594). Indeed, in multilayer graphene oxide filters, water evaporation occurred nearly at the rate for an open container while helium migrated 10 billion times slower (Nair et al., *Science,* 2012, 335, 442-444). In the nG filtration membrane, selectivity occurs over short molecular path that enables rapid transit for non-blocked species. Next, graphene is chemically flexible enabling attachment of a range of molecules specific to different chemical agents. Wise choice of these functional groups may also control the inter layer distance. For example, chemical spacers produced from covalent reactions of complementary molecules on the two nG membranes can provide a control of the interlayer separation between the two nG membranes. Indeed, the capability to build a sub-nanometer wide, chemically defined gallery for chemical filtration is a motivation for this technology. In the earlier graphene oxide work, a slight change in the thickness of the gallery reduced the flow rate by two orders of magnitude. Finally, the filter would be highly mechanically flexible, enabling it to be integrated into a fabric or otherwise worn.

Since the pore sizes required for a selective exclusion of cations such as $Na^+$ and $K^+$ during desalination is of the order 0.6-0.9 nm, it is desirable that the graphene pores be as narrow as achievable. Typical results with diblock polymers yield pore sizes ≥10 nm, although, recent refinements have brought smaller pores. Thus, the chemical functionalization of nanopores in graphene is useful as a handle to control the selectivity of the entities that pass through such nanopores. This may be achieved either by $UV-O_3$ etching or by a wise choice of gate-keeper ligands attached to the pore edge to control the dimensions and chemical nature of the entities that pass through. Since the density of pores in a conventional nanoporous membrane is of the order $10^{10}/cm^2$, it should be ensured that the density of pores in the graphene layer be comparable or greater to ensure no loss of flux in an application such as desalination. This can be easily achieved by patterning with a diblock polymer such as PS-pb-PB polymer which yields a pore density of $5 \times 10^{11}/cm^2$ after removal of one of the blocks (Park et al., *Science,* 1997, 276, 1401-1407; Harrison et al., *J. Vac. Sci. Technol. B* 1998, 16, 544-553). This value will further increase at least by an order of magnitude on UV-ozone etching, that forms sub-nanometer pores, of the region unmasked on underlying graphene on block removal.

Figure 3:
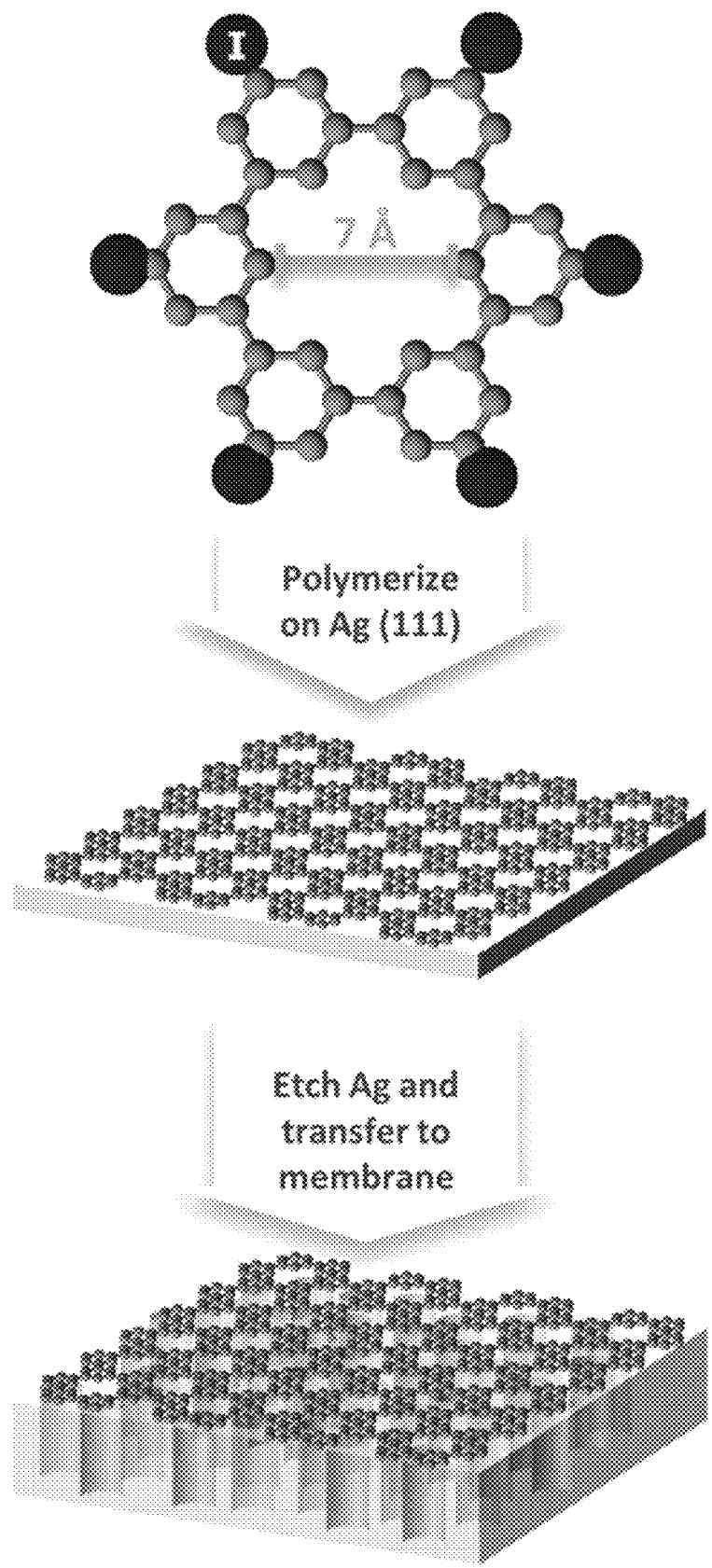
FIG. 3 shows a schematic representation of the nanoporous graphene layer obtained by Ag(111)-catalyzed polymerization of polycyclic compounds for use in the production of a hybrid delta membrane. The pores are ~0.7 nm in diameter.

In contrast to the top down method described above, in a second method, a robust bottom-up route to nG should be available via Ag(111)-catalyzed reactions of polycyclic compounds to form highly defined nanopores with 7-10 Å diameters. It has been reported that Ag(111) surface-assisted coupling of designed molecular building blocks can produce two-dimensional polyphenylene networks with single-atom wide pores and sub-nanometer periodicity yielding subnanometer pores with a density of $\sim 10^{13}$ pores/$cm^2$ (Bieri et al., *Chem. Comm.* 2009, 6919-6921). Hexaiodo-substituted macrocycles such as cyclohexa-m-phenylene can provide a 2D polymer network by aryl-aryl coupling at temperatures above 575 K with the desorption of the AgI byproduct occurring above 805 K. The formed network contains sub-nanometer pores with a uniform pore spacing of 7.4 Å (Bieri). Once the graphene nanomesh is formed, the underlying silver can be selectively etched in the [100] plane using a solution of $NH_4OH/H_2O_2$ (Mulvihill et al., *J. Am. Chem. Soc.* 2010, 132, 268-274), in the [110] facet by an aqueous solution of chloride ion and in the [111] facet by aqueous chlorauric acid ($HAuCl_4$) (Xu et al., *Nanotechnology* 2009, 20, 415601/1-7). Upon removal of the silver surface the nanoporous graphene can be transferred to a conventional nanoporous membrane as discussed before (FIG. 3), then stacked facially or functionalized with desired ligands followed by facial stacking.

The hydrophilicity/hydrophobicity of the produced nG graphene can be tuned by functionalizing with appropriate gatekeeper ligands at the nanopore rim and/or in the basal plane of the nG. For example, while functionalization with H or F will render the nG hydrophobic, ligands such as OH, COOH, or $NH_2$ will make it more hydrophilic. Furthermore, the presence of complimentary ligands on opposing nG layers can also give a means to produce crosslinks (chemical spacers) between the two graphene planes. For example, opposing nG layers that have $NH_2$ and COOH groups, respectively, as functional groups can yield amide bonds on close contact and reaction thereby producing amide chemical spacers, that further "fixes" the interlayer distance between the two nG layers. The hydrophilicity of the modified graphene can be tuned by functionalizing the graphene nanopores with various ligands.

Figure 4:
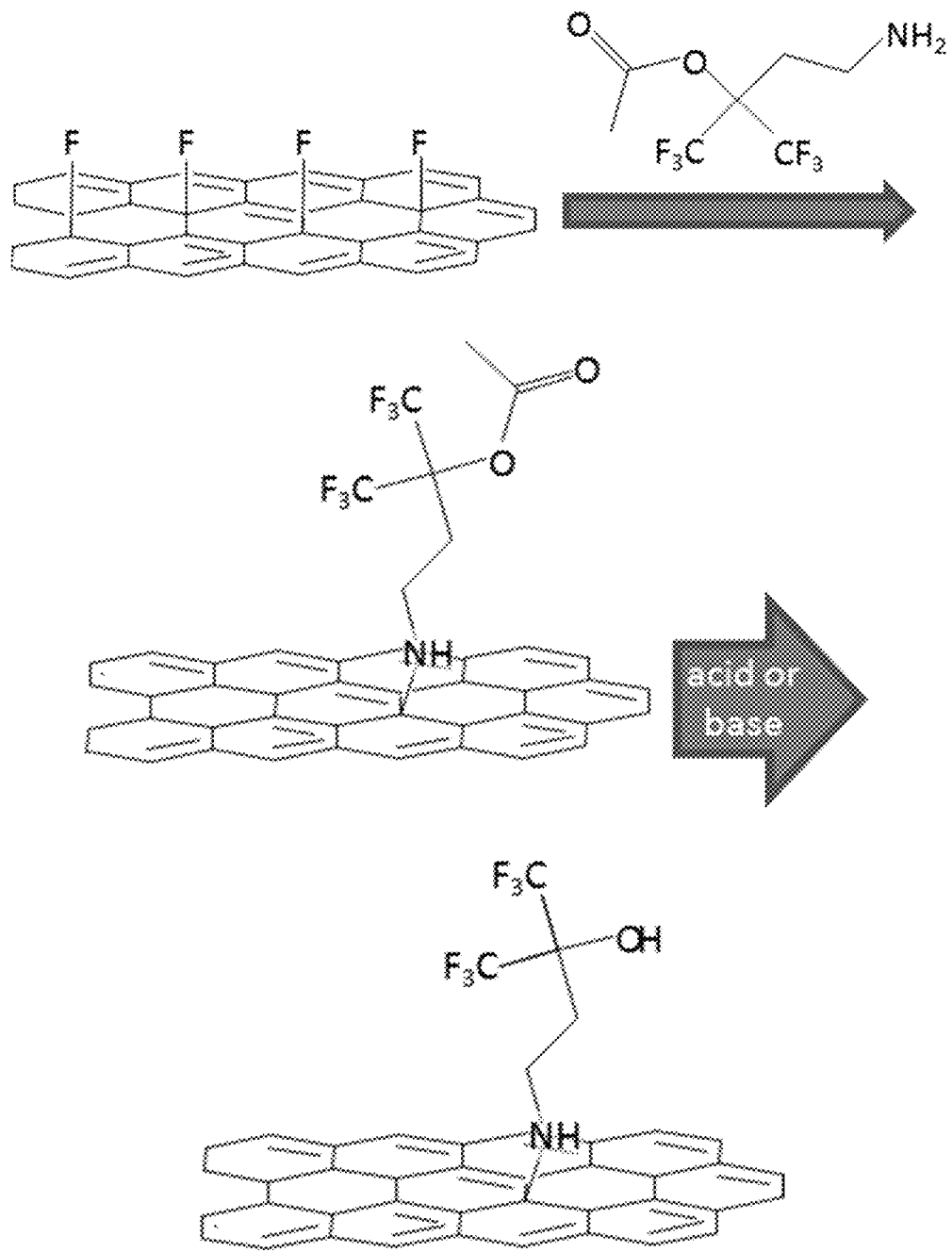
FIG. 4 shows attachment of a capture site to graphene.

Additionally, methods can be developed for the chemical attachment of CWA organo phosphonothoates (OP)-binding groups. To do this, the necessary ligands that capture OP agents are attached to the rims of the nanopores of the nG filtration membrane to act as gatekeeper ligands. nG may be first fluorinated by known methods (Nair et al., *Small* 2010, 6(24), 2877-2884; Robinson et al., *Nano Lett.* 2010, 10(8), 3001-3005) that are followed by reaction to attach hexafluoroisopropanol groups which more specifically bind DMMP (FIG. 4) (Snow et al., *Science* 2005, 307, 1942-1950). An alternate chemistry would generate oximes using the amination of the graphene (Chen et al., *J. Mater. Chem.* 2012, 22, 14076-14084; Baraket et al., *Appl. Phys. Lett.* 2012, 100, 233123/1-4; Wang et al., *Nanoscale* 2011, 3, 5059-5066). Such a selectively functionalized nG filtration membrane can capture G-series nerve agents from a water stream.

Regardless of the method used, the resulting article comprises a nanoporous membrane and a nanoporous graphene sheet layered on the nanoporous membrane. Suitable materials for the membrane include, but are not limited to, alumina, a polyamide, a polysulfone, or a polythiosulfone. The graphene sheet may have pores less than 20 or 10 nm in diameter, as well as sub-nm sizes.

The article may have a layer of diblock copolymer between the nanoporous graphene sheet and the nanoporous membrane. Suitable materials for the diblock copolymer include, but are not limited to, polystyrene-polybutadiene and polystyrene-polymethylmethacrylate.

The graphene sheet may have chemical functionalization on the side of the graphene sheet opposed to the membrane. Example functionalizations include, but are not limited to, fluoro, hydroxyl, carboxyl, amino, or 3,3-bis(trifluoromethyl)-3-hydroxylpropylamino. Two of the articles may be layered together with the chemical functionalization of both articles facing each other. In that case the chemical functionalization of the first article may be crosslinked to the chemical functionalization of the second article. Such a membrane may be used by flowing seawater or air through the membrane.

The nG filtration membranes may be characterized both by microscopic (SEM, TEM, and AFM) and spectroscopic (Raman, ATR-IR, XPS) techniques. The gas/liquid permeation performance may be assayed by forcing the permeant across the membrane using a pressurized gas for liquid permeants or variable external pressure for gas permeates. The average flux, $\langle v \rangle$, of the developed membrane may be determined using the Hagen-Poiseuille law (Cussler, *Diffusion, Mass Transfer in Fluid Systems*; Cambridge University Press: New York, 2009; p 654) modified for a porous solid: $\langle v \rangle = \varepsilon d^2 \Delta p / 32 \tau \mu l$, where $\Delta p$ is the pressure drop across the membrane, l is the membrane thickness, d is the pore diameter, $\varepsilon$ is the void fraction, and $\tau$ is the tortuosity. The selectivity and the rejection ability of the membranes may be calculated via the sieving coefficient, $S_a$, defined as the target species concentration in the permeant divided by that at the upstream membrane surface (Snow). The concentrations of the targeted species such as ions and total dissolved solids (TDS) in a liquid permeant downstream and upstream can be measured by measuring the electrical conductivity (conductivity meter) (Pawlowicz et al., *Desalination* 2012, 300, 32-39) or the refractive index (refractometer (Ho et al., *Optical Engineering* 2012, 51(2), 023605/1-12)/optical fiber (Zhao et al., *Sensors and Actuators B* 2002, 86, 63-67)) of the permeant prior to and after the passage through the membrane. Concentrations of ions and TDS can also be determined by gravimetric methods involving slow evaporation of the permeant. In the case of the OP agent or other CWA capture, the concentrations of the agent in the water permeant can also be determined by absorbance measurements of the water permeant or by measuring the absorbance of an organic solvent into which the agent may be extracted. Permeability measurements of gaseous species can be performed by the commonly used constant volume and variable pressure method (Barsema et al., *J. Membr. Sci.* 2003, 216, 195-205; Ploegmakers et al., *J. Membr. Sci.* 2013, 428, 445-453). The concentrations of the targeted species in a gaseous permeate can be measured by chromatographic techniques such as GC-MS or GC-FTIR/Raman (Barsema, Ploegmakers). The selectivity ($\alpha_{ij}$) for a targeted species j can be calculated using the expression $\alpha_{ij} = (y_i/y_j)/(x_i/x_j)$ where $y_j$ and $x_j$ are the downstream and upstream mole fractions of the species j, respectively. The hydrophilicity/hydrophobicity of the produced nG layers may be determined by contact angle measurements.

The use of nG layers in the membranes may confer the following advantages leading to diverse applications. (i) The density of pores in the nG may be >1000× that of conventional TFC membranes resulting in enhanced flux for either liquids or gases. (ii) The tortuosity (Dullien, *Porous Media: Fluid Transport and Pore Structure*; Academic Press: San Diego, 1992, p 574) of the single atom thick nG layers pores may be much less (~1) compared to that of the polyamide component TFC which should also enhance the flux. (iii) The single atom thick nG core region could also reduce the thickness of the membrane. Furthermore, graphene is mechanically robust, highly flexible, and can be made in large (30" diagonal) sheets. This enables one to scale manufacture to an appreciable size. Graphene is impermeable to fluids, even to hydrogen gas. Thus, only one or two graphene sheets with a total thickness less than a nm may be needed (Bai et al., *Nature Nanotech.* 2010, 5, 190-194). Additionally, such membranes may be exceptionally sturdy as the direct result of the structural and mechanical properties of graphene layers. This may enable the use of a smaller membrane area per unit flux, thereby facilitating either the use of a larger density of membranes or reducing the size and weight of the filtration unit. (iv) The nG core, that is one or a few atoms thick, may be immune to degradation induced by chlorine-containing agents such as hypochlorite used in desalination pretreatment. The flatness and chemical functionalization of the nG may greatly decrease biofouling. (v) Graphene is chemically flexible. A wide array of chemistries may be induced on the graphene surface and the science of chemically modifying graphene with dense and stable chemical functional groups is just beginning to be understood. Appropriately chemically modified graphene can be exceptionally selective. For instance, water migrates $10^{10}$ times faster than helium through nanoporous graphene oxide (Nair et al., *Science* 2012, 335, 442-444). (vi) The species permeation selectivity is controlled by the nG pore size which can be tuned during UV-ozone etching (Koenig et al., *Nature Nanotech.* 2012, 7, 728-732). (vii) Membranes can be tailored for specific removal of contaminants as diverse as salt water, CW agent, or radionuclides.

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:

1. An article comprising:
   a nanoporous membrane;
   a nanoporous graphene sheet layered on the nanoporous membrane; and
   a 3,3-bis(trifluoromethyl)-3-hydroxylpropylamino group covalently bound on only a side of the nanoporous graphene sheet opposed to the nanoporous membrane.

2. The article of claim 1, wherein the nanoporous membrane comprises alumina, a polyamide, a polysulfone, or a polythiosulfone.

3. The article of claim 1, wherein the nanoporous graphene sheet comprises pores less than 20 nm in diameter.

4. The article of claim 1, wherein the nanoporous graphene sheet comprises pores less than 10 nm in diameter.

5. The article of claim 1, wherein the nanoporous graphene sheet comprises pores that are sub-nanometer in diameter.

6. The article of claim 1, further comprising:
   a nanoporous layer of a polymer between the nanoporous graphene sheet and the nanoporous membrane.

7. The article of claim 6, wherein the polymer comprises polystyrene.

8. A membrane comprising:
   a first article of claim 1; and
   a second article of claim 1 layered on the first article;
      wherein the articles are layered with the 3,3-bis(trifluoromethyl)-3-hydroxylpropylamino groups of both articles facing each other.

9. The membrane of claim 8, wherein the 3,3-bis(trifluoromethyl)-3-hydroxylpropylamino group of the first article is crosslinked to the 3,3-bis(trifluoromethyl)-3-hydroxylpropylamino group of the second article, to form a spacer between the nanoporous graphene sheet of the first article and the nanoporous graphene sheet of the second article.

10. A method comprising:
    flowing seawater through the membrane of claim 8.

11. A method comprising:
    flowing air through the membrane of claim 8.

* * * * *

UNITED STATES PATENT AND TRADEMARK OFFICE
CERTIFICATE OF CORRECTION

| | | |
|---|---|---|
| PATENT NO. | : 10,525,421 B1 | Page 1 of 2 |
| APPLICATION NO. | : 14/207912 | |
| DATED | : January 7, 2020 | |
| INVENTOR(S) | : Manoj K. Kolel-Veetil and Paul E. Sheehan | |

It is certified that error appears in the above-identified patent and that said Letters Patent is hereby corrected as shown below:

On the Title Page

Under the abstract item (57), "11 Claims, 4 Drawing Sheets" should read "16 Claims, 4 Drawing Sheets"

In the Claims

Column 8, Line 19, after Claim 11, add the following:

12. A method comprising:
depositing a layer of a diblock copolymer onto a graphene sheet;
etching a minor phase of the diblock copolymer and a portion of the graphene in contact with the minor phase to form a nanoporous article comprising a nanoporous graphene sheet and a nanoporous layer of a polymer;
chemically functionalizing the graphene sheet by covalent bonding a 3,3-bis(trifluoromethyl)-3-hydroxylpropylamino group to form a functionalized nanoporous article;
layering the nanoporous article onto a nanoporous membrane with the nanoporous layer of a polymer in contact with the nanoporous membrane; and
removing any substrate from the nanoporous graphene sheet opposed to the diblock copolymer.

13. The method of claim 12, wherein pores that are sub-nanometer in diameter are etched into the graphene sheet.

14. The method of claim 12, wherein the diblock copolymer is polystyrene-polybutadiene.

15. The method of claim 12, further comprising:
layering two of the functionalized nanoporous articles together with the chemical functionalizations facing each other.

Signed and Sealed this
Twenty-first Day of April, 2020

Andrei Iancu
*Director of the United States Patent and Trademark Office*

16. The method of claim 15, further comprising:
crosslinking the chemical functionalizations to each other to form a spacer between the nanoporous graphene sheets.